(12) United States Patent
Hassan et al.

(10) Patent No.: US 9,870,790 B1
(45) Date of Patent: Jan. 16, 2018

(54) RECESSED AFM STITCH INTERFACE ENGINEERING

(71) Applicant: Seagate Technology LLC, Cupertino, CA (US)

(72) Inventors: Sameh Hassan, Derry (IE); Yuqing Du, Derry (IE); Marcus Ormston, Derry (IE); Denis O'Donnell, Derry (IE); Kevin McNeill, Derry (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/157,579

(22) Filed: May 18, 2016

(51) Int. Cl.
*G11B 5/39* (2006.01)
*G11B 5/31* (2006.01)

(52) U.S. Cl.
CPC .......... *G11B 5/3912* (2013.01); *G11B 5/3163* (2013.01); *G11B 5/3929* (2013.01)

(58) Field of Classification Search
CPC .... G11B 5/3912; G11B 5/3929; G11B 5/3163
USPC ........................................... 360/319, 324.11
See application file for complete search history.

(56) References Cited

U.S. PATENT DOCUMENTS

| | | |
|---|---|---|
| 7,092,221 B2 | 8/2006 | Gill |
| 7,961,440 B2 | 6/2011 | Gill et al. |
| 8,462,469 B1 | 6/2013 | Kanaya et al. |
| 8,711,528 B1 | 4/2014 | Xiao et al. |
| 9,001,473 B1* | 4/2015 | Gao ..................... G11B 5/3945 360/324.11 |
| 9,030,785 B2 | 5/2015 | Freitag et al. |
| 9,171,559 B1* | 10/2015 | Nikolaev ............. G11B 5/3932 |
| 9,269,383 B1 | 2/2016 | Hattori et al. |
| 9,318,133 B2* | 4/2016 | Freitag ................. G11B 5/3909 |
| 2005/0270703 A1* | 12/2005 | Hayakawa ............... G11B 5/39 360/324.1 |
| 2012/0276415 A1 | 11/2012 | Sapozhnikov et al. |
| 2015/0179195 A1* | 6/2015 | Freitag ................. G11B 5/3932 360/75 |
| 2015/0221328 A1* | 8/2015 | Le ........................ G11B 5/3932 360/324.12 |
| 2015/0248907 A1* | 9/2015 | Freitag ................. G11B 5/3116 360/99.08 |

(Continued)

OTHER PUBLICATIONS

Richard M. Bozorth, "Ferromagnetism", p. 250, 1993, Wiley—IEEE Press.

*Primary Examiner* — Jefferson Evans
(74) *Attorney, Agent, or Firm* — Westman, Champlin, Koehler, P.A.

(57) ABSTRACT

A read sensor and fabrication method thereof. The method includes forming a bottom stack that includes an antiferromagnetic (AFM) layer, a lower ferromagnetic stitch layer above the AFM layer and a sacrificial cap layer on the lower ferromagnetic stitch layer. The sacrificial cap layer is formed of a material that alloys magnetically with the lower ferromagnetic stitch layer. The method further includes substantially removing the sacrificial cap layer. After substantially removing the sacrificial layer, an upper ferromagnetic stitch layer is deposited on the lower ferromagnetic stitch layer of the bottom stack to form a stitch interface that provides relatively strong magnetic coupling between the lower ferromagnetic stitch layer of the bottom stack and the upper ferromagnetic stitch layer.

18 Claims, 20 Drawing Sheets

(56) References Cited

U.S. PATENT DOCUMENTS

2016/0035378 A1* 2/2016 Quan ................... G11B 5/127
  428/811.2
2016/0293187 A1* 10/2016 Makino ............... G11B 5/3912
2016/0293188 A1* 10/2016 Degawa ............... G11B 5/3912
2017/0076743 A1* 3/2017 Hassan ............... G11B 5/3163

* cited by examiner

RECESSED AFM STITCH INTERFACE ENGINEERING

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities.

SUMMARY

The present disclosure relates to a technique for improving magnetic coupling across an interface between a bottom stack of a read sensor and a top stack of the read sensor. In some embodiments, the bottom stack is recessed from a bearing surface of the read sensor and includes a recessed antiferromagnetic layer, and the top stack of the read sensor is not recessed from the bearing surface.

In one embodiment, a method of fabricating a read sensor is provided. The method includes forming a bottom stack that includes an antiferromagnetic (AFM) layer, a lower ferromagnetic stitch layer above the AFM layer and a sacrificial cap layer on the lower ferromagnetic stitch layer. The sacrificial cap layer is formed of a material that alloys magnetically with the lower ferromagnetic stitch layer. The method further includes substantially removing the sacrificial cap layer. After substantially removing the sacrificial layer, an upper ferromagnetic stitch layer is deposited on the lower ferromagnetic stitch layer of the bottom stack to form a stitch interface that provides relatively strong magnetic coupling between the lower ferromagnetic stitch layer of the bottom stack and the upper ferromagnetic stitch layer.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments described below relate to a technique for improving magnetic coupling across an interface between a bottom stack of a read sensor and a top stack of a read sensor. In some embodiments, the bottom stack is recessed from a bearing surface of the read sensor and includes a recessed antiferromagnetic (AFM) layer, and the top stack of the read sensor is not recessed from the bearing surface. However, prior to providing additional details regarding the different embodiments, a description of an illustrative operating environment is provided below.

Figure 1:
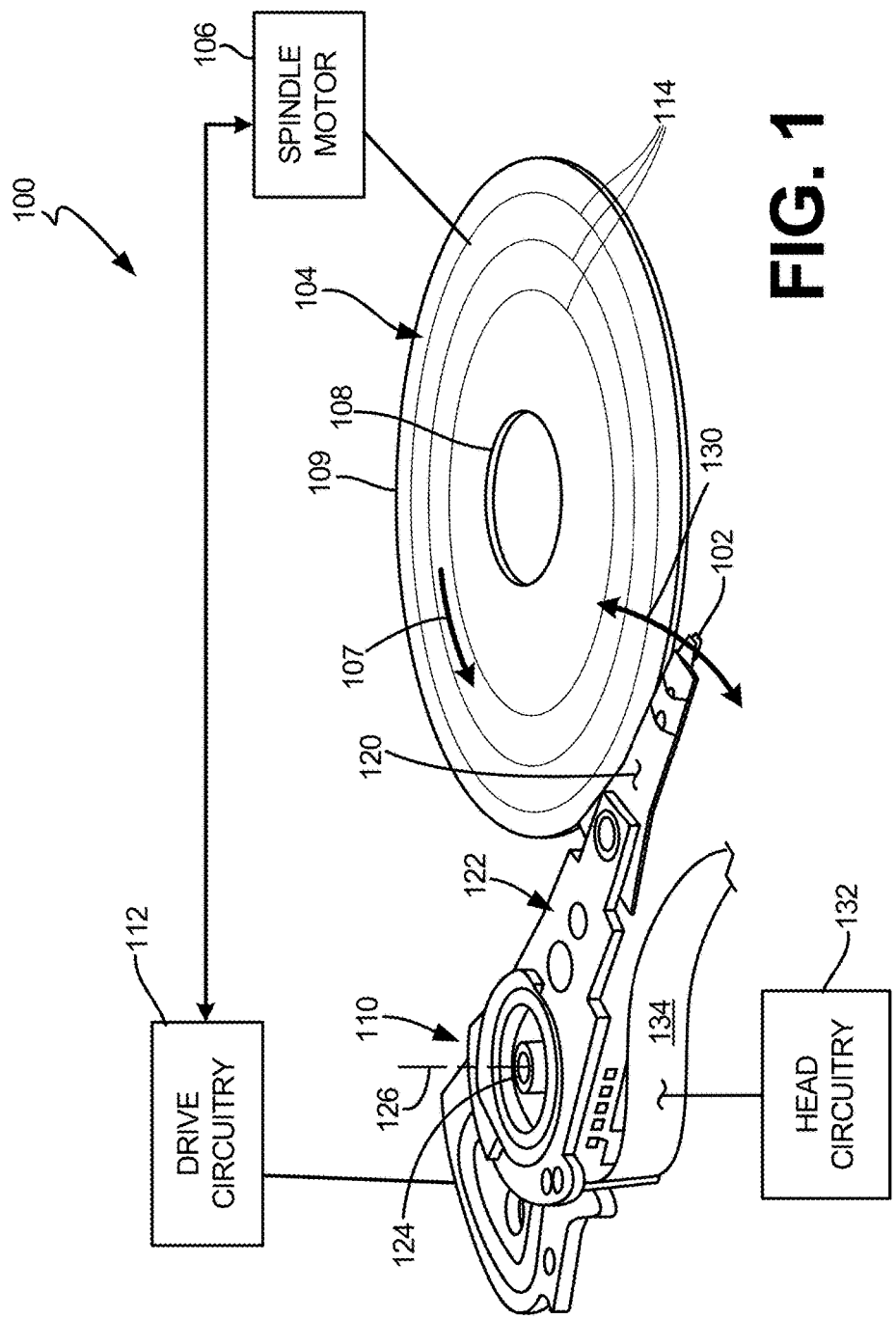
FIG. 1 is a schematic illustration of an example data storage system including a data storage medium and a head for reading data from and/or writing data to the data storage medium.

FIG. 1 shows an illustrative operating environment in which read sensors fabricated using embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
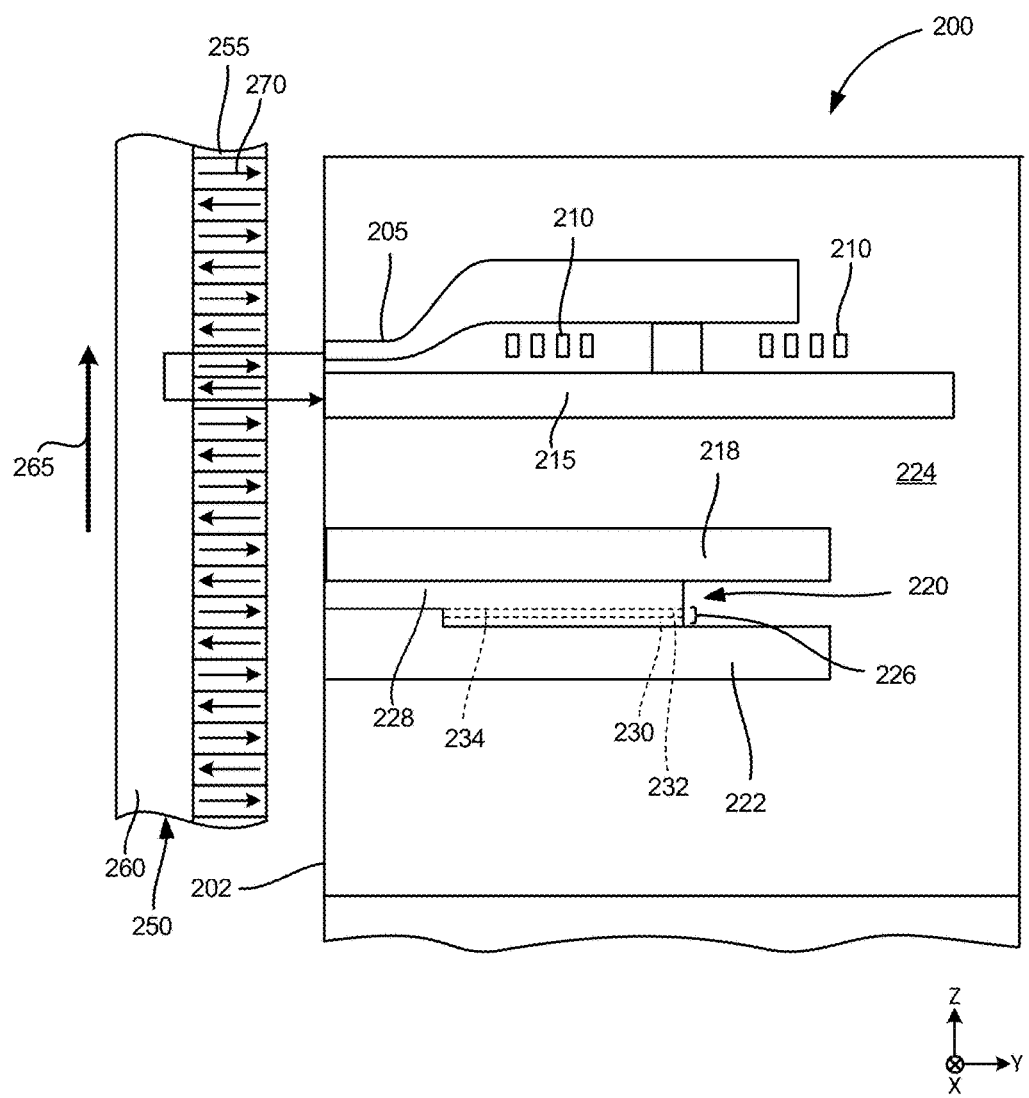
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head, such as recording head 102 in FIG. 1. Medium 250 is illustratively a data storage medium, such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read sensor 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read sensor 220 senses or detects magnetization patterns in recording layer 255, and is used in retrieving information previously recorded to layer 255.

Read sensor 220 may include a bottom stack 226 and a top stack 228. As can be seen in FIG. 2, the bottom stack 226 is recessed from the bearing surface 202 of the read sensor 220. The bottom stack 226 includes an AFM layer 230 and at least one ferromagnetic layer 232. The top stack 228 includes a ferromagnetic layer which is in contact with the ferromagnetic layer 232 of the bottom stack 226 at a stitch interface 234. Top stack 228 may include additional layers that are not shown in FIG. 2. Stitch interface 234 is engineered to provide improved magnetic coupling between bottom stack 226 and top stack 228.

In the reader embodiments, layers of read sensor 220 may be stacked along a track direction (i.e., a z-direction in FIG. 2) or a track width direction that is normal to the track direction (i.e., a cross-track direction, which is an x-direction in FIG. 2). A y-direction in FIG. 2 is then defined as a direction that is perpendicular to x and z simultaneously, which is a stripe-height direction. In the embodiment shown in FIG. 2, layers of read sensor 220 may be stacked along the track direction. Structural and functional details of one reader sensor embodiment are provided below in connection with FIGS. 3A and 3B. Thereafter, potential problems related to domain wall formation in reader sensors that are fabricated using certain techniques are described in connection with FIG. 4. A new read sensor fabrication technique is then described further below in connection with FIGS. 5A-5F.

Figure 3A:
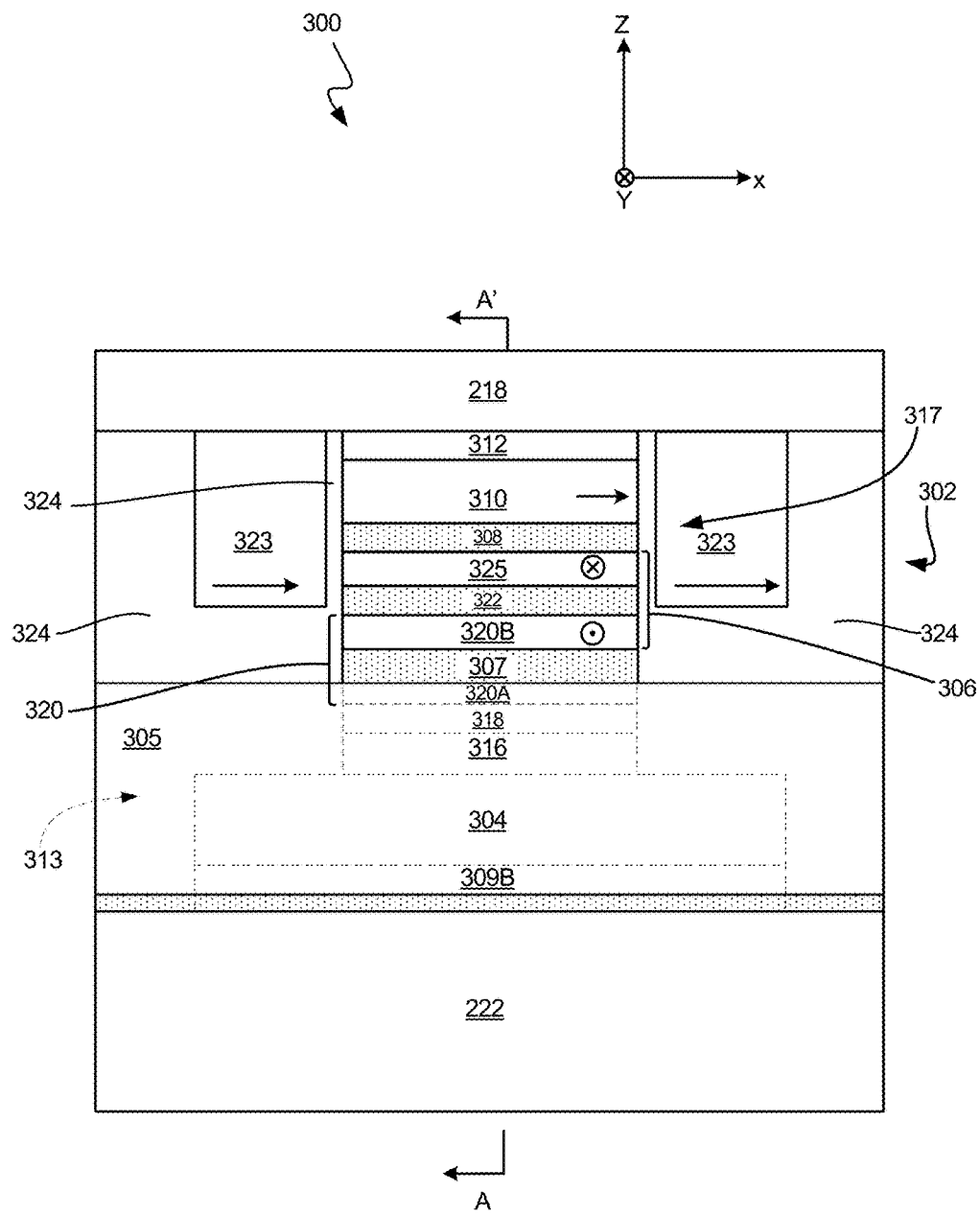
FIG. 3A is a bearing surface view of a first embodiment of a magnetic reproducing device.

FIG. 3A is a bearing surface view of a magnetic reproducing device/reader 300 that includes a magnetoresistive sensor 302 that employs a recessed AFM layer in accordance with a first embodiment. Recessed elements including recessed AFM layer 304 of reader 300 are visible in FIG. 3B, which is a cross-sectional view of reader 300 of FIG. 3A through a plane orthogonal to the bearing surface and layers of reader 300 (along line A-A' shown in FIG. 3A). Reader embodiments that employ the recessed AFM layer 304 are formed by a fabrication process that is described further below in connection with FIGS. 5A-5F.

Figure 3B:
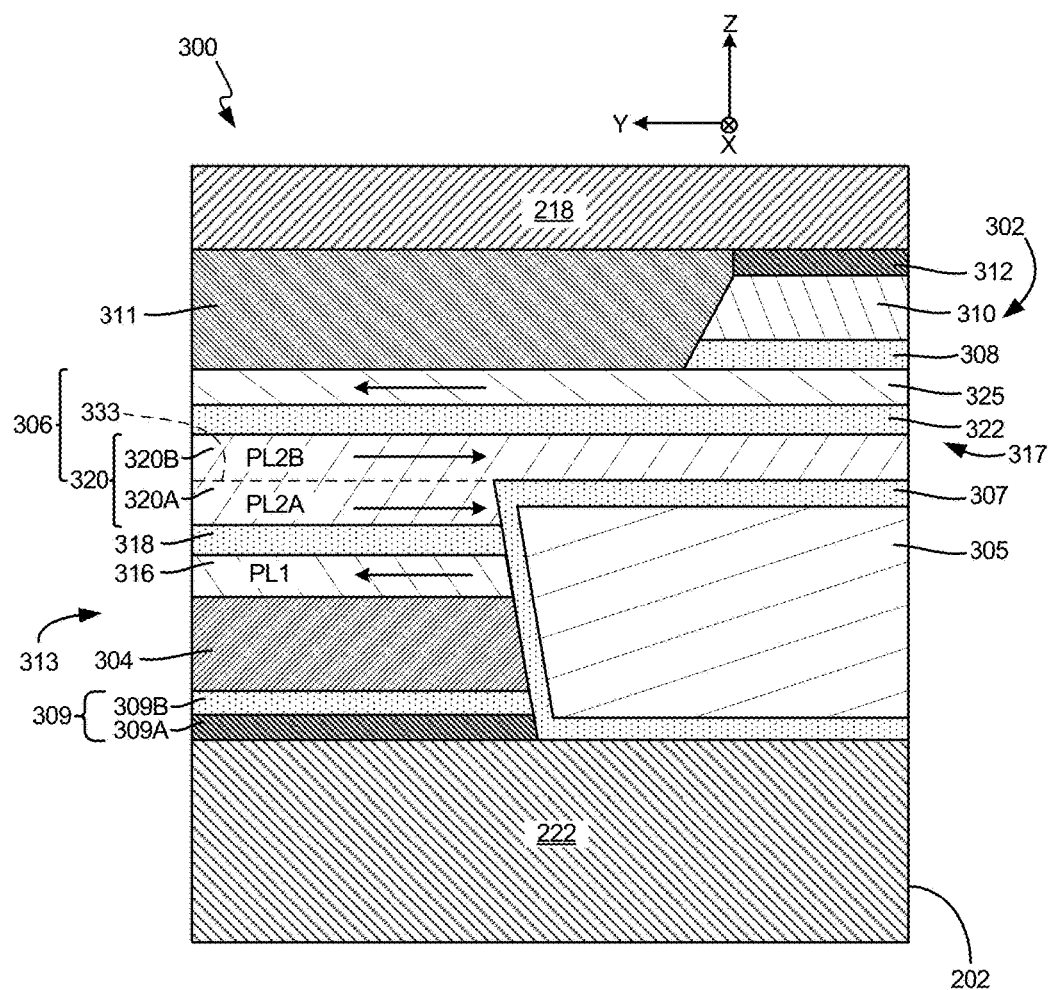
FIG. 3B is a sectional view of the magnetic reproducing device of FIG. 3A.

Referring to FIGS. 3A and 3B, magnetoresistive sensor 302 is positioned between a top shield 218 and a bottom shield 222. Also, a front portion of magnetoresistive sensor 302 is above a reader front shield (RFS) 305 that is positioned in front of recessed AFM layer 304. Top, bottom and front shields 218, 222 and 305, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the shields 218, 222 and 305 permit magnetic fields from the bit directly under magnetoresistive sensor 302 to affect the magnetoresistive sensor 302, and thus be read.

The magnetoresistive sensor 302 includes a plurality of layers including a non-recessed synthetic antiferromagnetic (SAF) structure 306, a spacer layer 308, a free layer or sensing layer 310 and a stack cap 312. Stack cap 312 may be formed of a non-magnetic layer (for example, a ruthenium (Ru) layer) that has a thickness that is sufficient to magnetically decouple the free layer 310 from the top shield 218. A similar decoupling layer 307 is included between the RFS 305 and the SAF structure 306.

In the embodiment shown in FIGS. 3A and 3B, AFM layer 304 is a part of a bottom stack 313 that includes a seed layer 309 below the AFM layer 304, a first pinned layer (PL1) 316 on the AFM layer 304, a lower separation or spacer layer (for example, a Ru layer) 318 on the first pinned layer 316 and a lower ferromagnetic stitch layer 320A on the separation or spacer layer 318. In some embodiments, seed layer 309 may be a single layer of a non-magnetic material such as Ru, tantalum (Ta), etc. In other embodiments, seed layer 309 may be a multi-layered structure including a lower layer 309A (formed of Ta, for example) and an upper layer 309B (formed of Ru, for example). In general, seed layer 309 may include one or more layers made of any suitable material or materials. First pinned layer 316 and lower ferromagnetic stitch layer 320A may be formed of ferromagnetic materials. Examples of suitable materials for layers 316 and 320A include CoFe, NiFe and CoNiFe. In some embodiments, layers 316 and 320A may be formed of a same material. In other embodiment, a material used to form first pinned layer 316 may be different from a material used to form lower ferromagnetic stitch layer 320A. Examples of materials used to form AFM layer 304 include IrMnCr, IrMn, FeMn, PtMn, NiMn, PdMn, PtPdMn and RhMn. Of course, any other suitable materials may also be used.

In magnetoresistive sensor 302, the non-recessed SAF structure 306 includes an upper ferromagnetic stitch layer 320B, an upper separation or spacer layer 322 and a reference layer 325. Layers 320B and 325 are ferromagnetic layers (formed of CoFe, NiFe, CoNiFe, etc.), and layer 322 is a thin non-magnetic layer that may comprise a metal such as Ru in some embodiments. As will be described in detail further below, layers 320B, 322 and 325 are a part of a top stack (denoted by reference numeral 317) that is formed by a second deposition process, which takes place after bottom stack 313 is formed by a first deposition process. Dashed line 333 represents a stitch interface between stacks 313 and 317. Lower ferromagnetic stitch layer 320A and upper ferromagnetic stitch layer 320B are ferromagnetically coupled across the stitch interface 333. Layers 320A and 320B together constitute a second pinned layer (PL2) 320, with layer 320A being a lower portion (PL2A) of the second pinned layer 320 and layer 320B being an upper portion (PL2B) of the second pinned layer 320.

The first pinned layer 316 and the second pinned layer 320 are antiferromagnetically coupled through lower separation layer 318 via Ruderman-Kittel-Kasuya-Yosida (RKKY) exchange interaction. Similarly, the second pinned layer 320 and the reference layer 325 are antiferromagnetically coupled through upper separation layer 322 via RKKY exchange interaction. The magnetic moments of layers 316, 320A, 320B and 325 are generally oriented normal to the plane (i.e., the y direction) of FIG. 3A. The second pinned layer 320 has its magnetic moment generally oriented anti-parallel to the magnetic moment of the first pinned layer 316. Also, the reference layer 325 has its magnetic moment generally oriented anti-parallel to the magnetic moment of the second pinned layer 320.

In the embodiment shown in FIGS. 3A and 3B, the magnetic moment of the free layer 310 is free to rotate under the influence of an applied magnetic field in a range of interest. The read head 300 further includes side biasing magnets or side shields 323, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. The magnetoresistive sensor 302 is separated and electrically isolated from the side biasing magnets 323 by an isolation layer 324 including, for example, insulating materials. Isolation layer 324 may also be present in other regions of head 300 as shown in FIG. 3A. An isolation layer behind free layer 310 is denoted by reference numeral 311.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between reference layer 325 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

One technique for fabricating a read sensor of the type described above in connection with FIGS. 3A and 3B involves first forming a bottom stack with layers such as 309, 304, 316, 318 and 320A deposited one above the other. Additionally, a top-most layer of the bottom stack is a sacrificial Ru cap layer deposited on layer 320A. The sacrificial Ru cap layer is then etched, and a top stack having a bottom-most layer such as 320B is "stitched" to the bottom stack. It has proven challenging to maintain the quality of the interface between the bottom and top stacks due to the effect of nonmagnetic contamination, which has the potential to magnetically decouple the two stacks. Contamination after the etch process may be from a remainder of the sacrificial Ru cap layer of the bottom stack. Due to the nature of the etch process, there may be intermixing of materials (i.e., any remaining material of the sacrificial Ru cap layer may alloy with CoFe (or other ferromagnetic material of layer 320A) to form a nonmagnetic decoupling layer at the interface of layer 320A and 320B (i.e., the interface of PL2A and PL2B)). As will be discussed below in connection with FIG. 4, such a non-magnetic decoupling layer at the interface of PL2A and PL2B may produce undesirable polarity reversals, which may cause failure of a drive that employs the read sensor.

Figure 4:
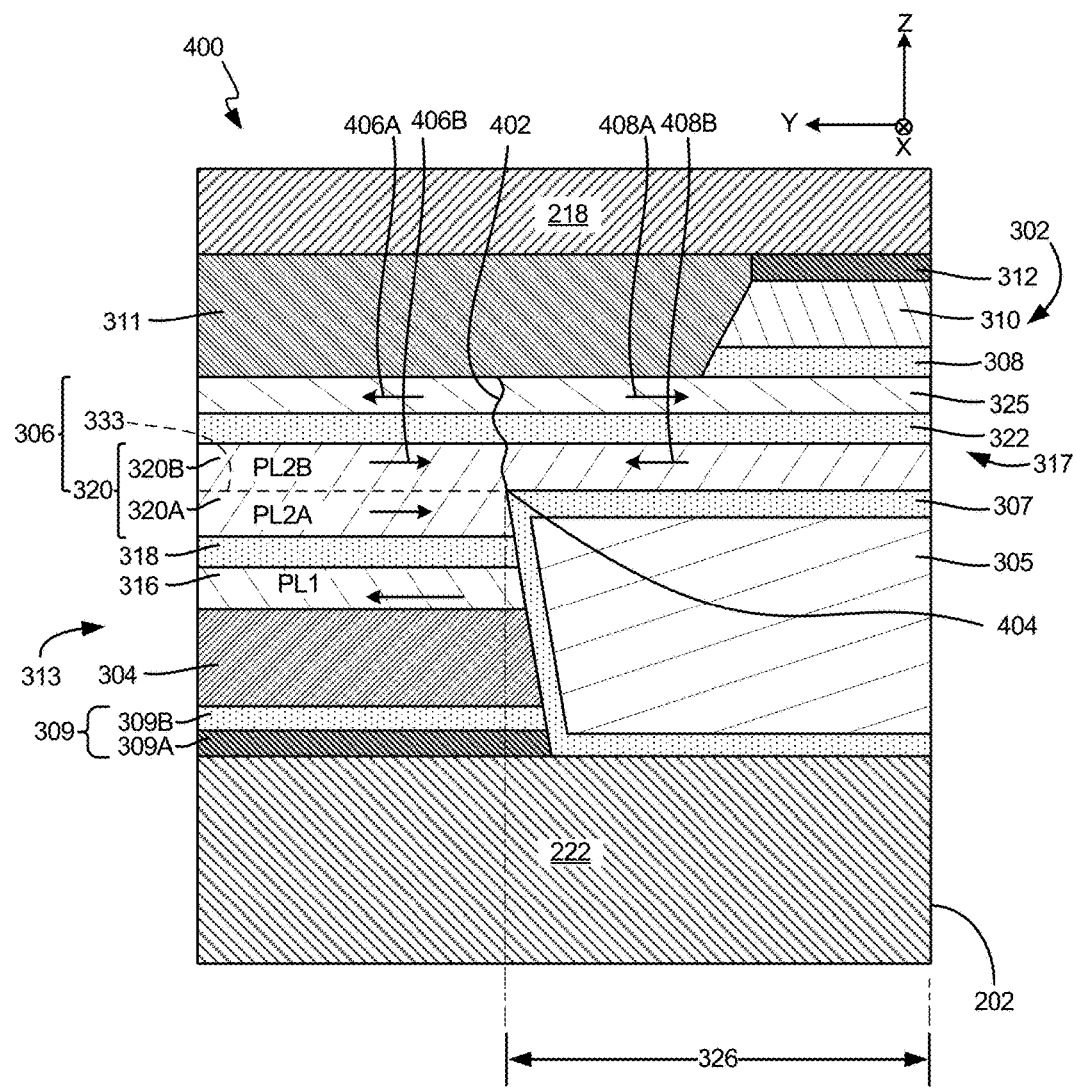
FIG. 4 is a sectional view of a magnetic reproducing device illustrating magnetization directions in layers of the device.

FIG. 4 illustrates a read sensor 400, which is similar to read sensor 300 of FIGS. 3A and 3B (i.e., after sensor fabrication, the layers of sensor 400 are substantially similar to the layers of sensor 300). Thus, to avoid repetition, a bearing surface view of sensor 400 is not shown and described. Only a side cross-sectional view similar to the view in FIG. 3B is shown in FIG. 4. As can be seen in FIG. 4, in a sensor 400 formed using a sacrificial Ru cap layer, polarity reversals may occur when a domain wall 402 forms at a point of recession 404, which is a point where a front-most portion of layer 320A (PL2A) is positioned at a distance 326 behind the bearing surface 202. Specifically, magnetization directions 406A and 406B in portions of reference layer 325 and PL2B 320B behind domain wall 402 are substantially opposite to magnetization directions 408A and 408B in portions of reference layer 325 and PL2B 320B in front of the domain wall 402. Such a condition could cause a failure in a disc drive that includes a read sensor such as 400. Embodiments described below provide novel techniques for improving magnetic coupling across a stitch interface (such as 333), between bottom and top stacks of a read sensor by tailoring the interface magnetics using a sacrificial nonmagnetic cap that can alloy magnetically with PL2A 320A.

In one embodiment, instead of utilizing Ru, an iridium (Ir) film is employed as a sacrificial cap layer for the bottom stack. Specifically, the Ir sacrificial film is deposited on PL2A and then etched. This is followed by partially etching PL2A. PL2B is then deposited on the partially etched PL2A layer. As will be described further below, sheet film data shows that there is a clear enhancement in ferromagnetic coupling between PL2A and PL2B when an Ir film is used as the sacrificial cap layer instead of a Ru film. The enhancement in ferromagnetic coupling may be attributed to enhanced magnetic properties of the stitch interface when Ir is used as the sacrificial cap layer.

Figure 5A:
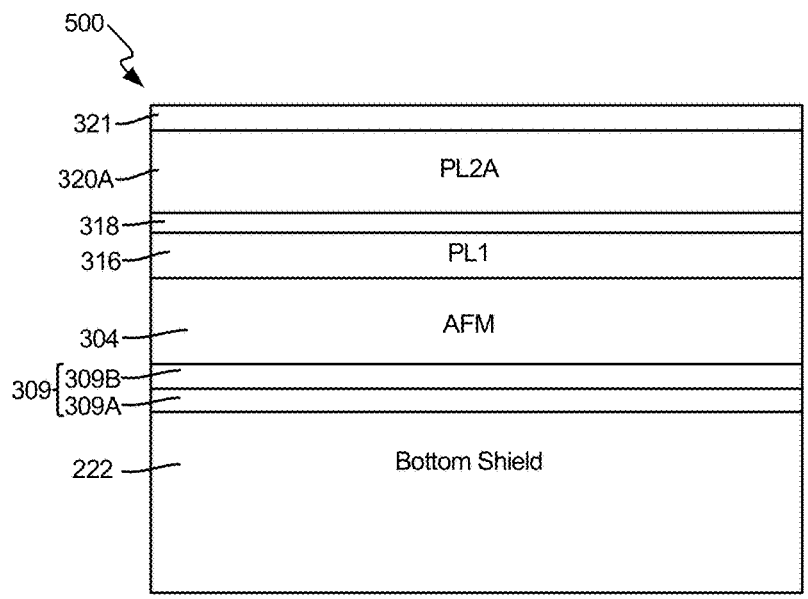
FIGS. 5A-5F are diagrammatic illustrations showing a method of fabricating a magnetic reproducing device of the type shown in FIGS. 3A and 3B.

A method of fabricating of a read sensor such as 300 (of FIGS. 3A and 3B) using an Ir sacrificial cap layer is described below in connection with FIGS. 5A-5F. FIG. 5A shows an initial stack 500 from which recessed bottom stack 313 is formed in a manner described below. Initial stack 500 may be formed by a first deposition process that involves sequentially depositing the layers shown in FIG. 5A. First, a bottom shield layer 222 is deposited on a substrate (not shown). The bottom shield layer 222 is formed of a magnetic material and the substrate (not shown) on which the bottom shield layer 222 is applied may be formed of an insulator that may include alumina, $SiO_2$, or any other suitable material. A seed layer 309 is then deposited on the bottom shield layer 222. As noted earlier, seed layer 309 may be a single layer of a non-magnetic material such as Ru, tantalum (Ta), etc., or a multi-layered structure. In the embodiment shown in FIG. 5A, seed layer 309 is a bi-layered structure including a lower layer 309A of Ta and an upper layer 309B formed of Ru. In one embodiment, lower layer 309A formed of Ta may be about 15 angstroms (Å) thick and layer 309B formed of Ru may be about 18 Å thick. Of course, in other embodiments, materials other than Ru and/or Ta may be used to form layers 309A and/or 309B and the layers may have any suitable thickness values. An AFM layer 304 is deposited on seed layer 309. In stack 500, AFM layer 304 is formed of IrMnCr and may have a thickness of about 30 Å. However, in other embodiments, materials such as IrMn, FeMn, PtMn, NiMn, PdMn, PtPdMn and RhMn may instead be used to form AFM layer 304. Also, AFM layer 304 may be of any suitable thickness in different embodiments. First pinned layer (PL1) 316 is deposited on the AFM layer 304. First pinned layer 316 may be formed of a ferromagnetic material such a CoFe, NiFe, etc. In one embodiment, layer 316 is about 25 Å thick and is formed of CoFe. In other embodiments, layer 316 may be of any suitable thickness. Lower separation or spacer layer 318 is deposited on the first pinned layer 316. In one embodiment, layer 318 is a Ru layer that is about 8.4 Å thick. In other embodiments, suitable materials other than Ru and thicknesses other than 8.4 Å may be employed. A second pinned layer portion (that later forms the lower ferromagnetic stitch layer) 320A is deposited on the lower separation or spacer layer 318. In the embodiment of FIG. 5A, second pinned layer portion 320A is formed of a same material as PL1 316. However, in different embodiments, any suitable magnetic material may be utilized for the second pinned layer portion 320A. In stack 500, the second pinned layer portion 320A is formed with a thickness of about 75 Å. However, other thicknesses for layer 320A may be suitable in other embodiments. A sacrificial Ir cap layer 321 is formed on the second pinned layer portion 320A. The sacrificial Ir cap layer 321 may be about 30 Å thick in one embodiment. In other embodiments, layer 321 may be of any suitable thickness.

Figure 5B:
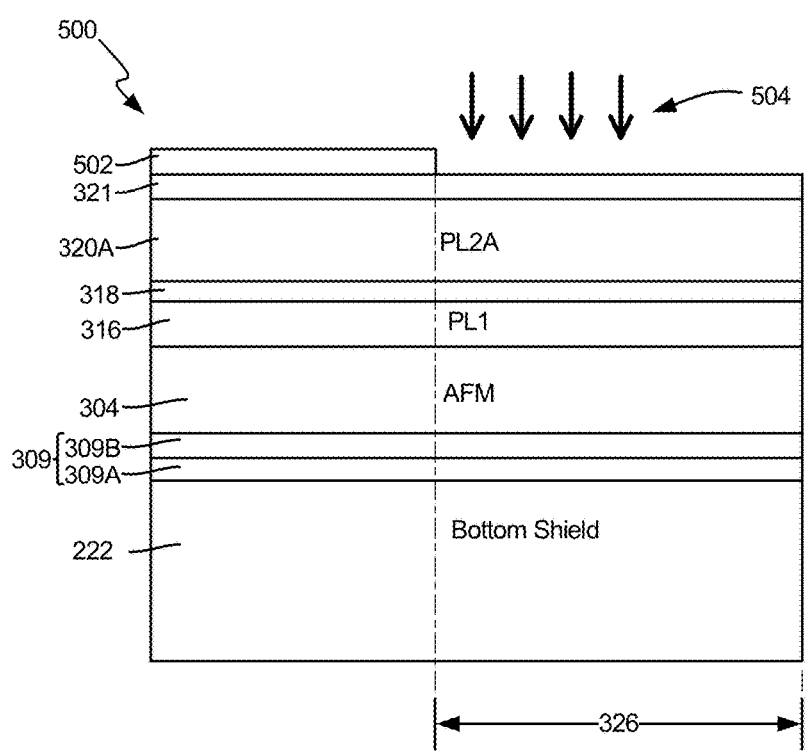

Referring now to FIG. 5B, a mask structure 502 is formed over the sacrificial Ir cap layer 321. The mask structure can include one or more layers such as one or more hard mask layers, one or more image transfer layers, and/or a mask material such as photoresist or thermal image resist. As can be seen in FIG. 5B, the mask structure 502 at distance 326 behind the (future) bearing surface defines recessed bottom stack 313 (of FIG. 3B). A material removal process such as milling or dry ion etching, or some other process is performed to remove portions of the layers, 309, 304, 316, 318, 320 and 321 that are not protected by the mask structure 502 to form recessed bottom stack 313 (of FIG. 3B). The material removal process, represented by downward-pointing arrows 504 may be performed, for example, by directing an ion beam normal to stack 500.

Figure 5C:
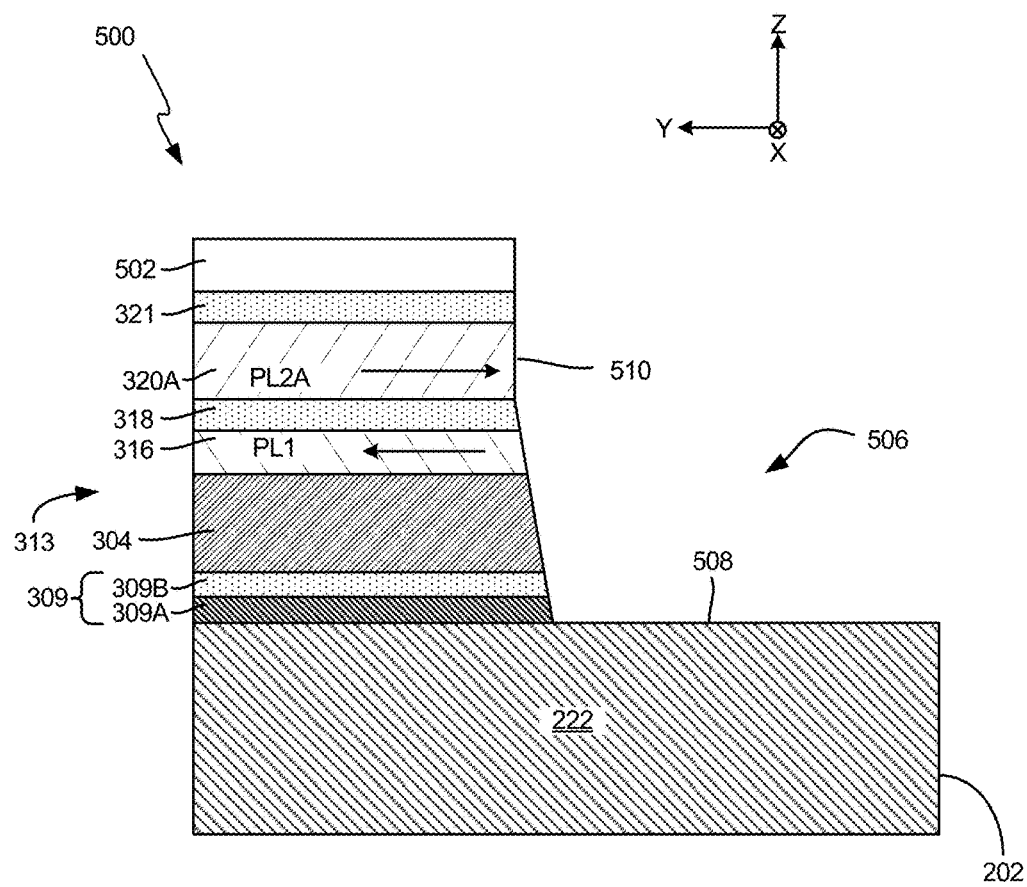

As a result of the ion beam being directed as shown by arrows 504 in FIG. 5B, material from portions of layers 309, 304, 316, 318, 320 and 321 not directly beneath the mask structure 502 may be removed to form trench 506, which is shown in FIG. 5C. As can be seen in FIG. 5C, trench 506 has a bottom surface 508, which is an upper surface of bottom shield 222, and a side surface 510.

Figure 5D:
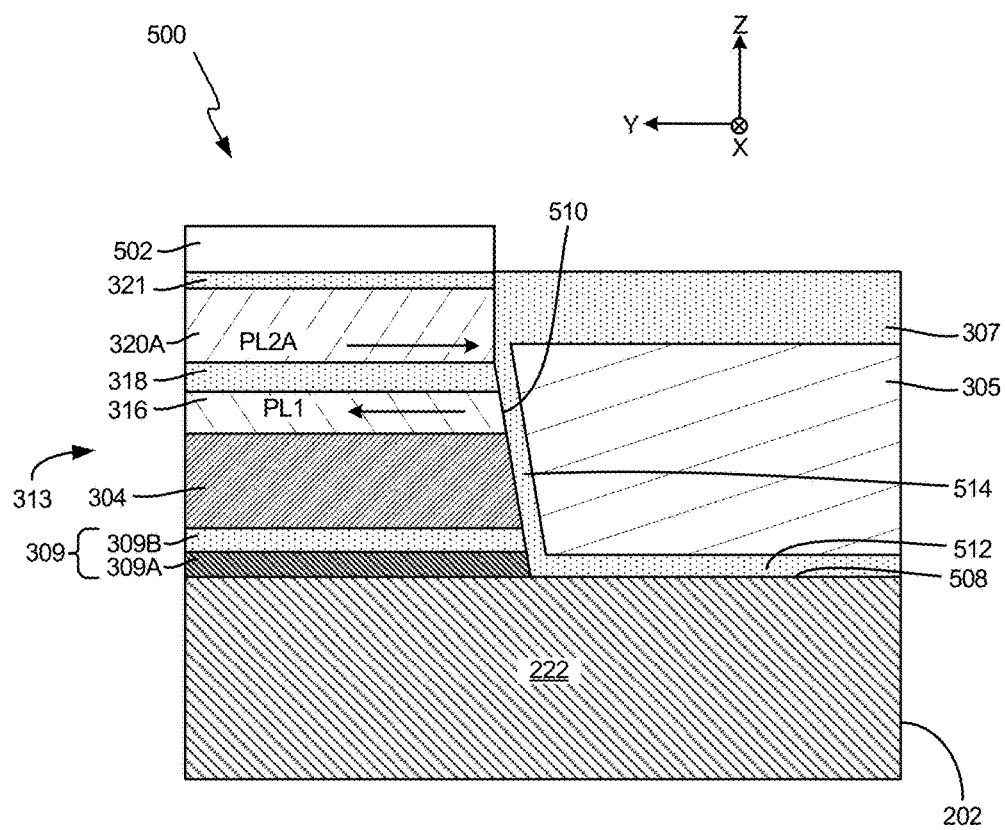

Referring now to FIG. 5D, non-magnetic layers 512 and 514 are deposited on trench bottom surface 508 and trench side surface 510, respectively. Layers 512 and 514 may be deposited by a conformal process such as atomic layer deposition (ALD) or some other conformal process. In one embodiment, layers 512 and 514 are Ru layers. In other embodiments, layers 512 and/or 514 may be formed of materials other than Ru. RFS 305 is then deposited over layer 512 and such that it abuts layer 514. RFS 305 may be formed of any suitable magnetic material. Decoupling layer 307 is deposited on RFS 305 such that decoupling layer 307 abuts PL2A 320A and also abuts sacrificial Jr cap layer 321. A top surface of decoupling layer 307 may be substantially flush with a top surface of Jr sacrificial cap layer 321. In one embodiment, decoupling layer 307 is formed of Ru.

Figure 5E:
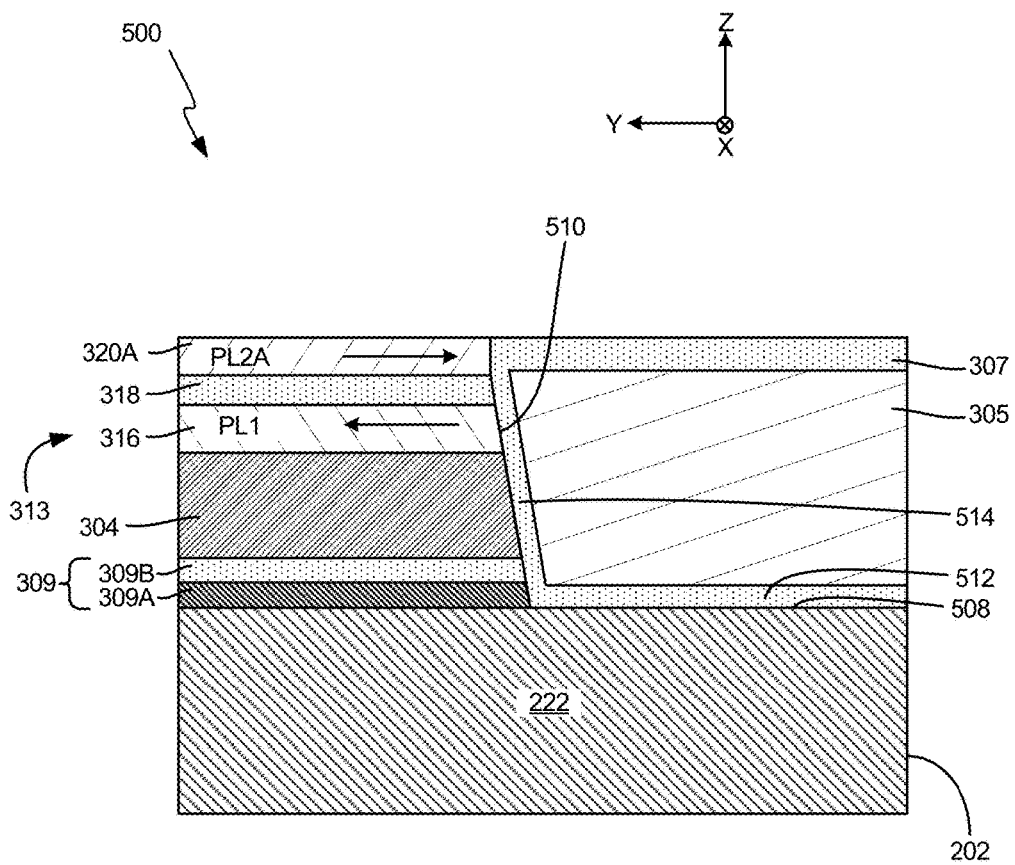

Referring now to FIG. 5E, any suitable technique is employed to remove mask structure 502. Thereafter, Jr sacrificial cap layer 321 is etched. This is followed by partially etching PL2A 320A. It should be noted that the etching process that removes the sacrificial Jr cap layer 321 and partially removes PL2A 320A also removes a portion of the decoupling layer 307, such that a top surface of etched decoupling layer 307 is substantially flush with a top surface of layer PL2A 320A.

Figure 5F:
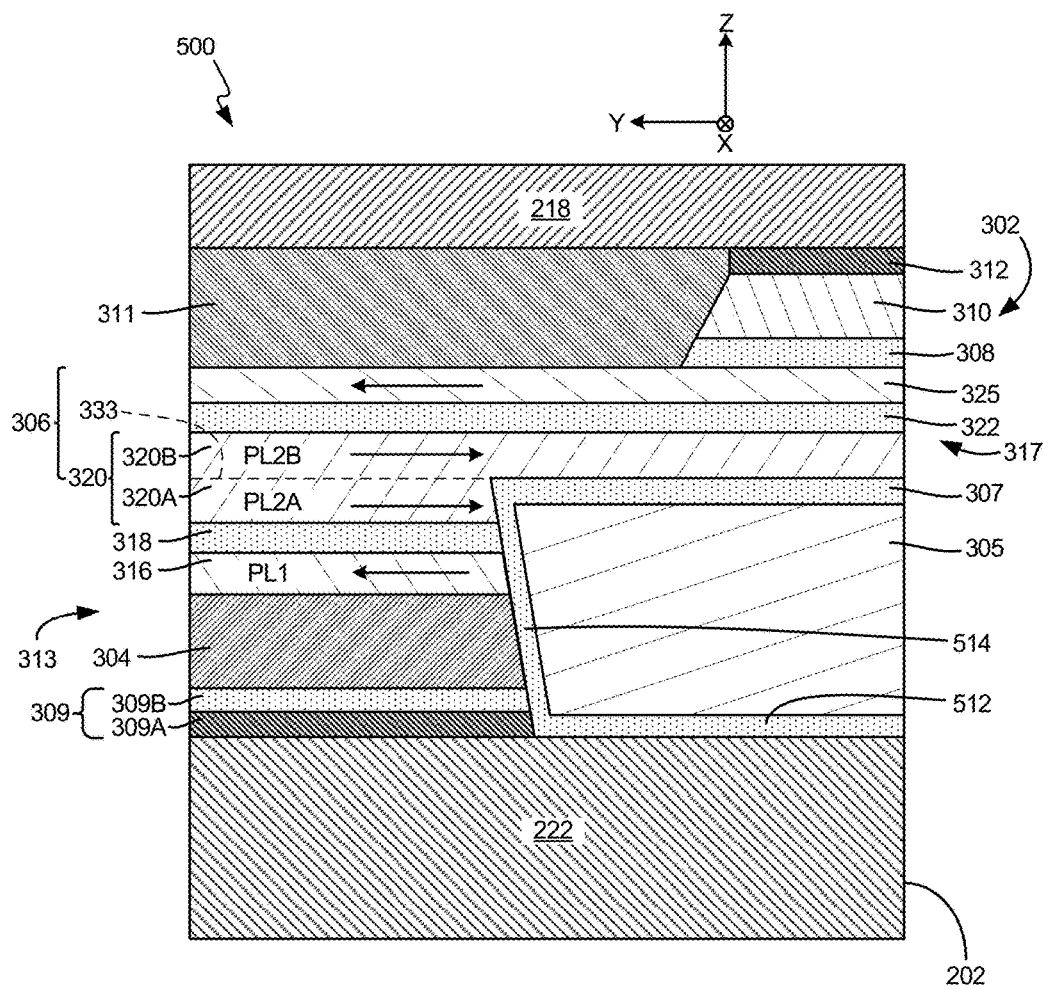

Referring now to FIG. 5F, upper ferromagnetic stitch layer PL2B 320B is deposited on PL2A 320A and on decoupling layer 307 as part of a second deposition process. The remaining layers of read sensor 300 are then deposited. As noted above, substantial enhancement in ferromagnetic coupling between PL2A and PL2B is achieved when a sacrificial Jr cap layer is used instead of a sacrificial Ru cap layer. A reason for such enhanced ferromagnetic coupling is that Jr is a material that alloys magnetically with PL2A.

Thus, other materials that alloy magnetically with PL2A may be used instead of Jr as the sacrificial cap layer to produce similar enhanced ferromagnetic coupling. Examples of such other materials include, but are not limited to, Pt, Pd and Rh.

A sacrificial cap layer that alloys magnetically with a ferromagnetic layer on which it is deposited may also be employed in other reader designs that include recessed AFM layers. Illustrative non-limiting examples of such devices are shown in FIGS. 6A, 6B, 7A, 7B, 8A and 8B.

Figure 6A:
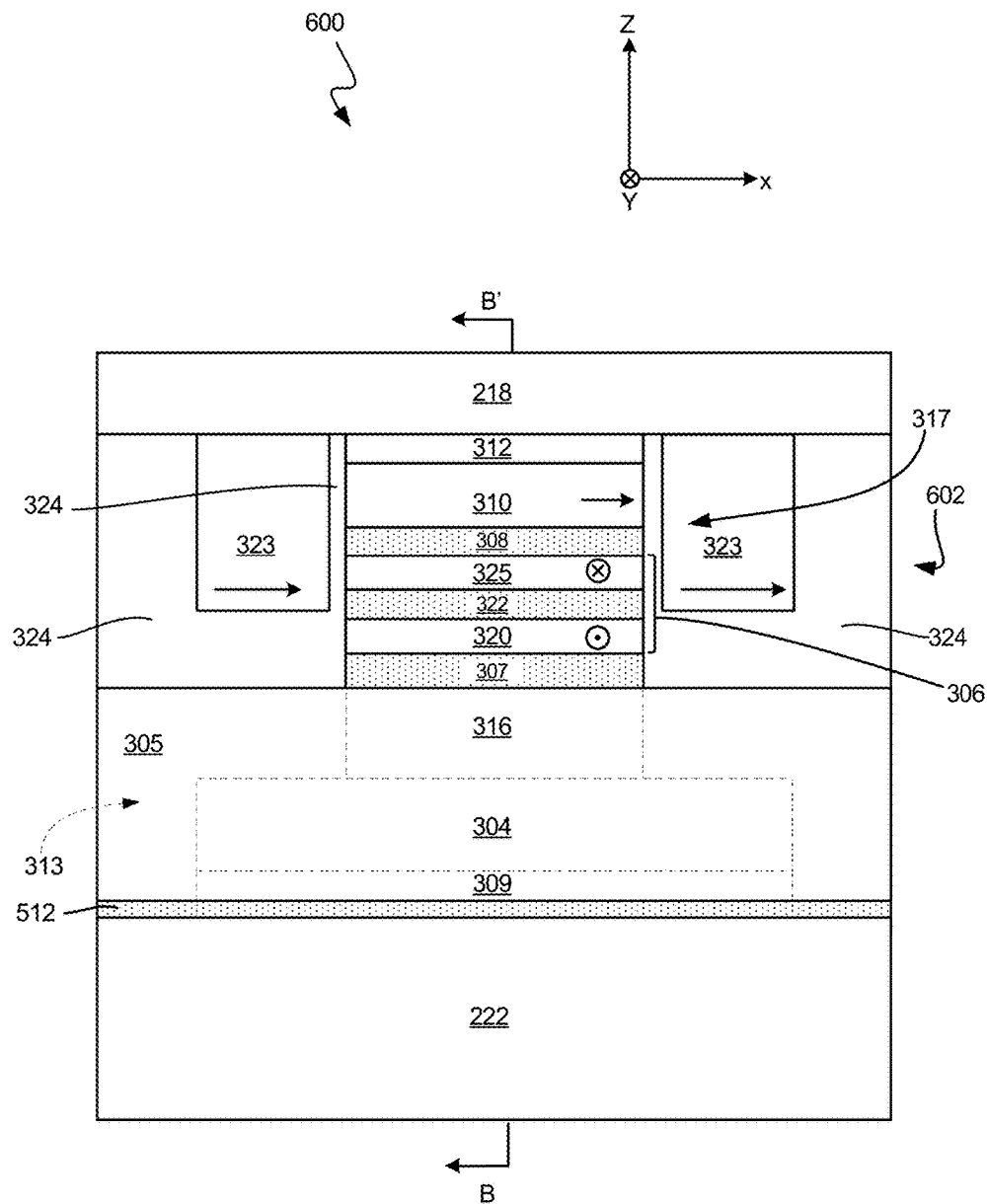
FIG. 6A is a bearing surface view of a second embodiment of a magnetic reproducing device.
Figure 6B:
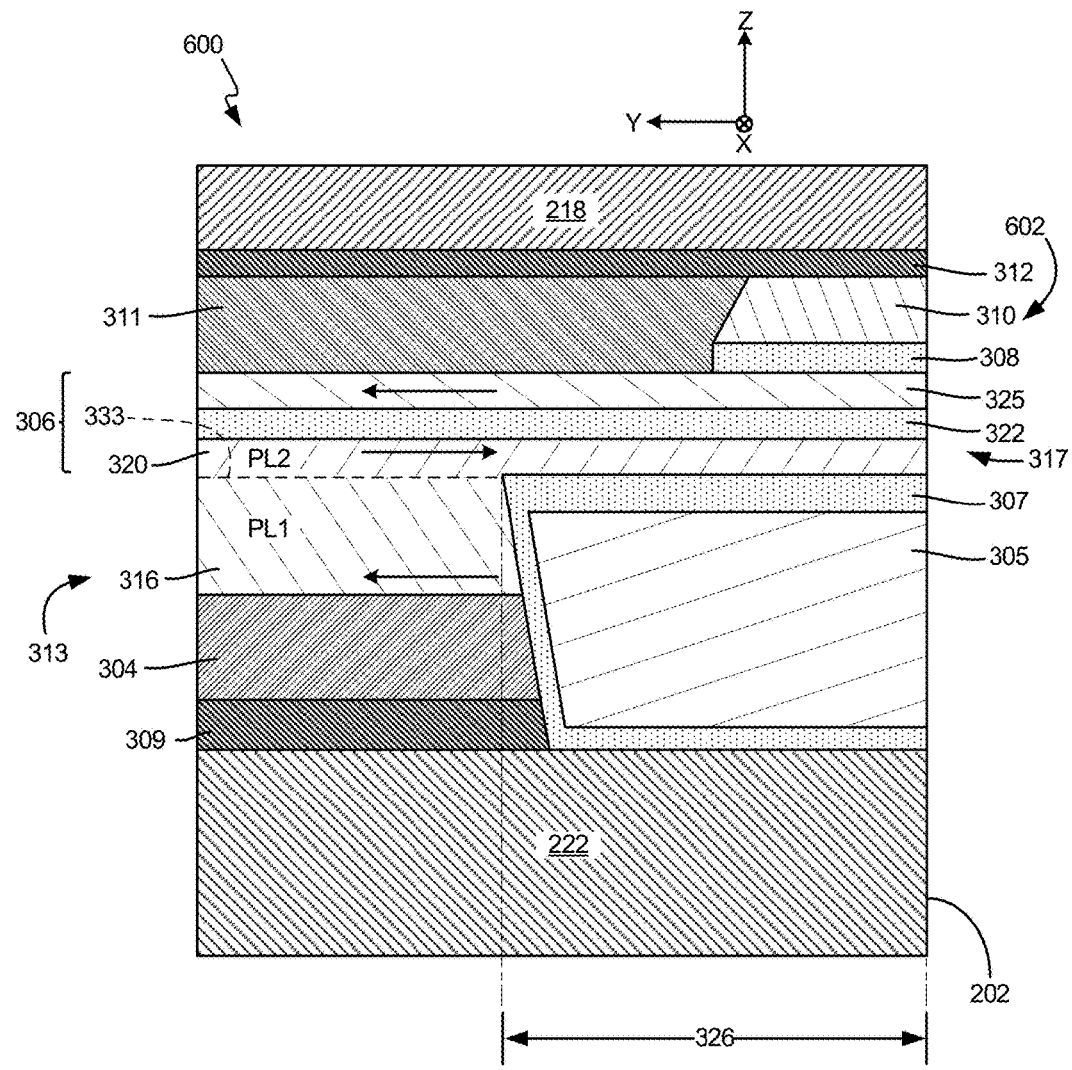
FIG. 6B is a sectional view of the magnetic reproducing device of FIG. 6A.

FIG. 6A is a bearing surface view of a magnetic reproducing device/reader 600 that includes a magnetoresistive sensor 602 that employs a recessed AFM layer in accordance with a second embodiment. Recessed elements including recessed AFM layer 304 of reader 600 are visible in FIG. 6B, which is a cross-sectional view of reader 600 of FIG. 6A through a plane orthogonal to the bearing surface and layers of reader 600 (along line B-B' shown in FIG. 6A). Reader 600 differs from reader 300 (of FIGS. 3A and 3B) in that it does not include a lower separation or spacer layer such as 318 (shown in FIG. 3B) between a first pinned layer (PL1) 316 (shown in FIG. 3B) and lower ferromagnetic stitch layer (PL2A) 320A (of FIG. 3B). Instead, PL1 316 in the lower ferromagnetic stitch layer in sensor 600. Also, as can be seen in FIG. 6B, stitch interface 333 is between the PL1 316 and PL2 320. To enhance ferromagnetic coupling between PL1 316 and PL2 320, a fabrication process utilized to "stitch" PL1 316 and PL2 320 employs a sacrificial cap layer that alloys magnetically with PL1 316. As noted above, examples of materials for the sacrificial layer include Ir, Pt, Pd and Rh.

Figure 7A:
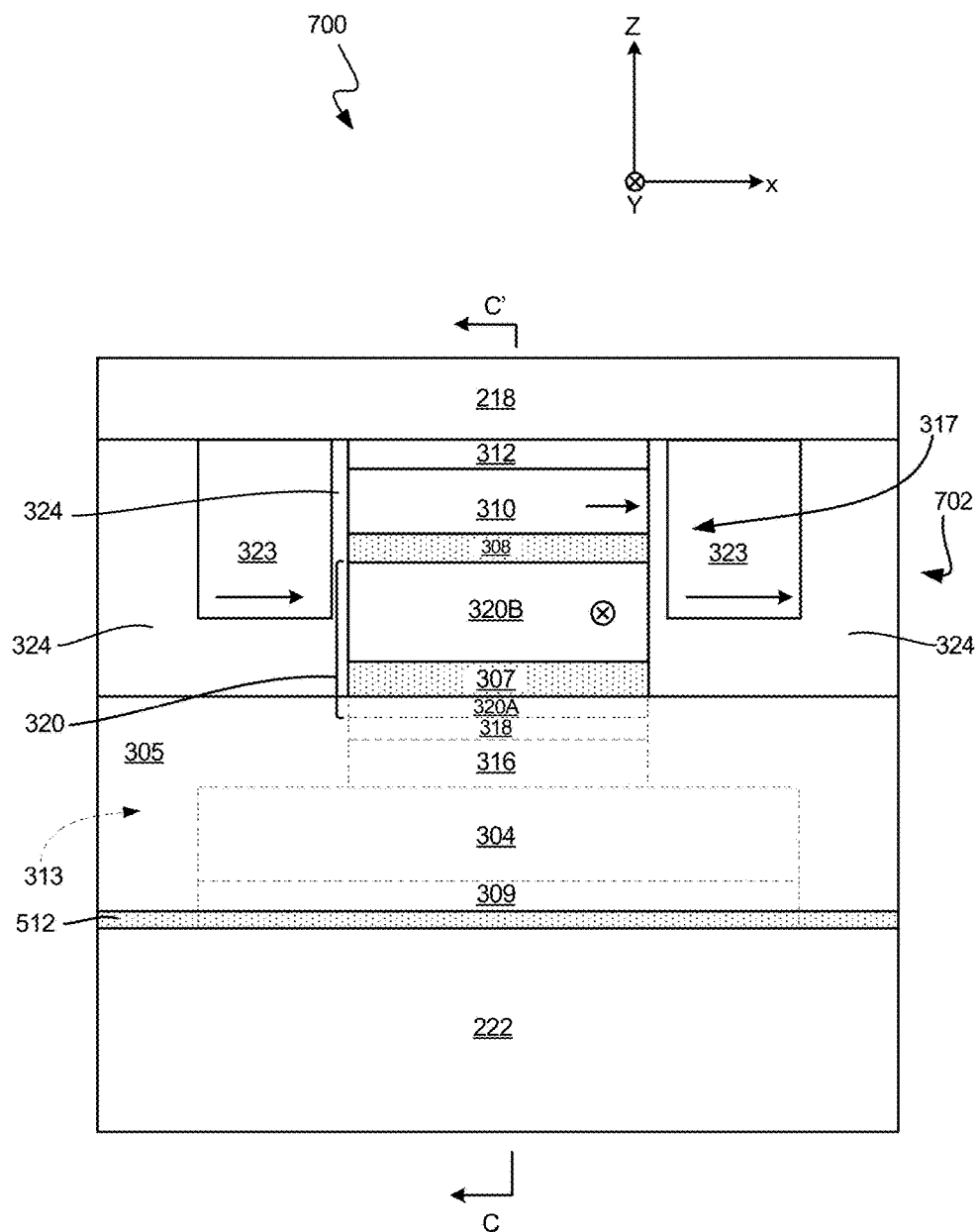
FIG. 7A is a bearing surface view of a third embodiment of a magnetic reproducing device.
Figure 7B:
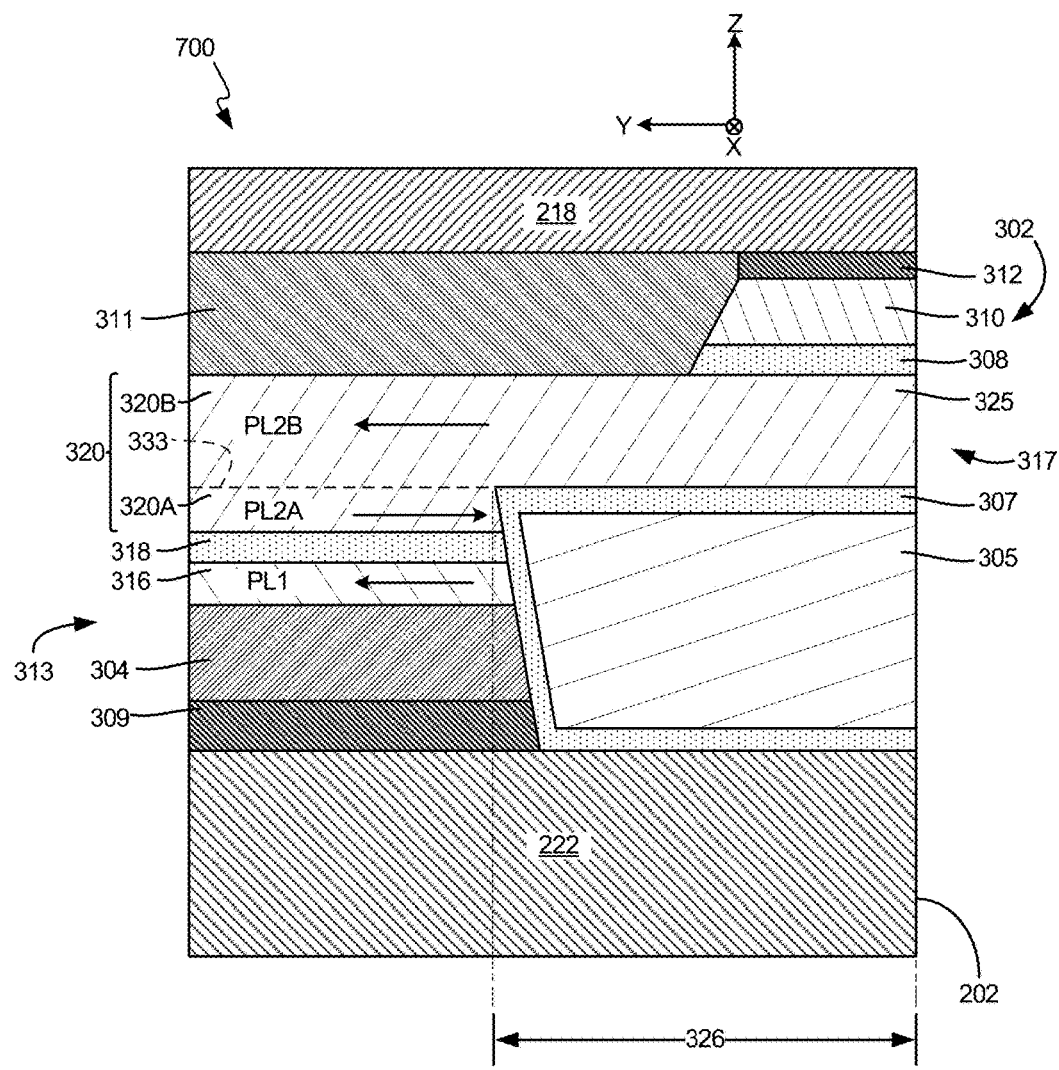
FIG. 7B is a sectional view of the magnetic reproducing device of FIG. 7A.

FIG. 7A is a bearing surface view of a magnetic reproducing device/reader 700 that includes a magnetoresistive sensor 702 that employs a recessed AFM layer in accordance with a third embodiment. Recessed elements including recessed AFM layer 304 of reader 700 are visible in FIG. 7B, which is a cross-sectional view of reader 700 of FIG. 7A through a plane orthogonal to the bearing surface and layers of reader 700 (along line C-C' shown in FIG. 7A). Reader 700 differs from reader 300 (of FIGS. 3A and 3B) in that it does not include upper separation or spacer layer 322 (shown in FIGS. 3A and 3B) and reference layer 325 (shown in FIGS. 3A and 3B). In other respects, reader 700 is substantially similar to reader 300 (of FIGS. 3A and 3B). A fabrication process utilized to form reader 700 employs a sacrificial cap layer formed of a material (Ir, Pt, Pd, Rh, etc.) that alloys magnetically with PL2A 320A to form a suitable stitch interface 333.

Figure 8A:
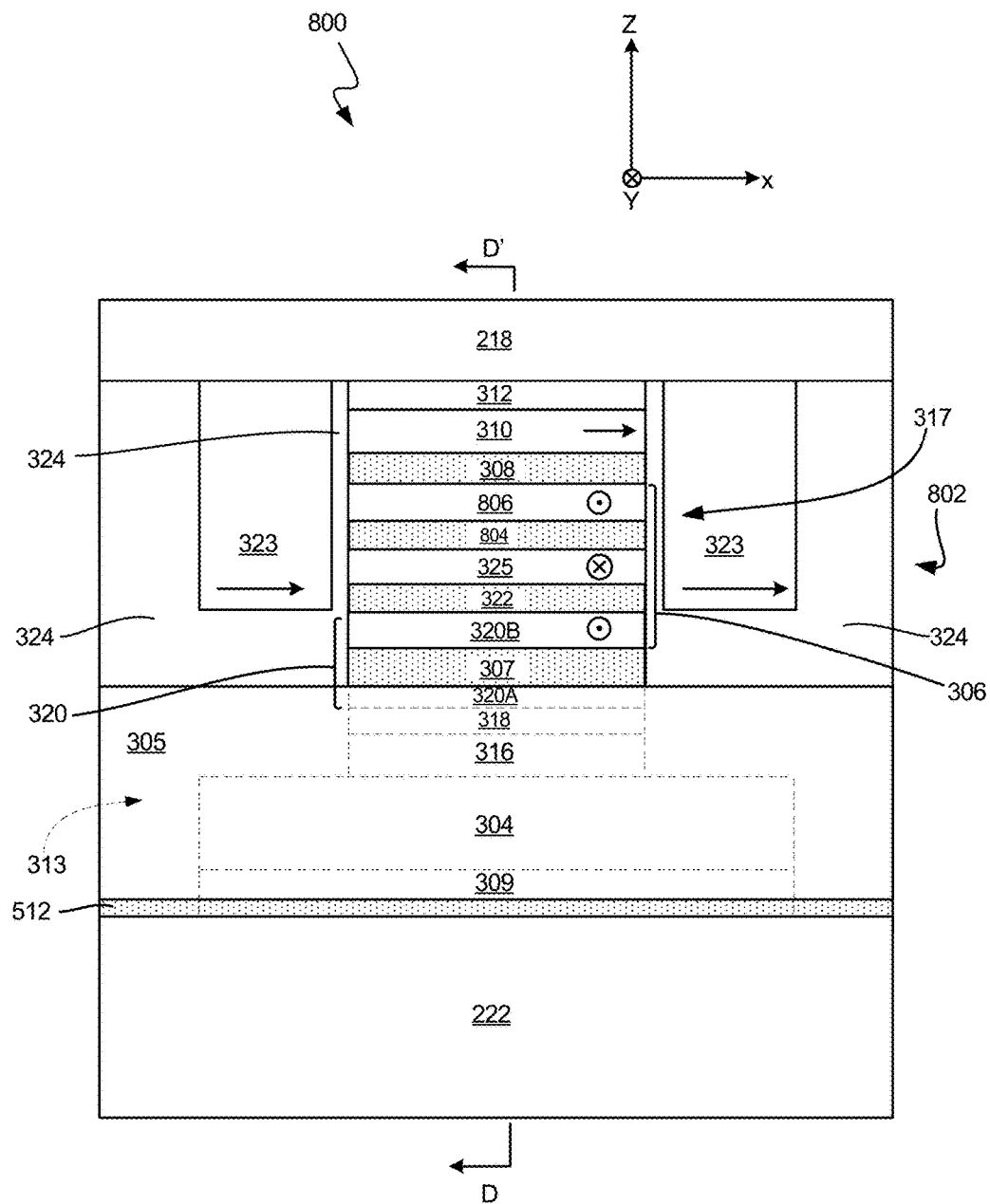
FIG. 8A is a bearing surface view of a fourth embodiment of a magnetic reproducing device.
Figure 8B:
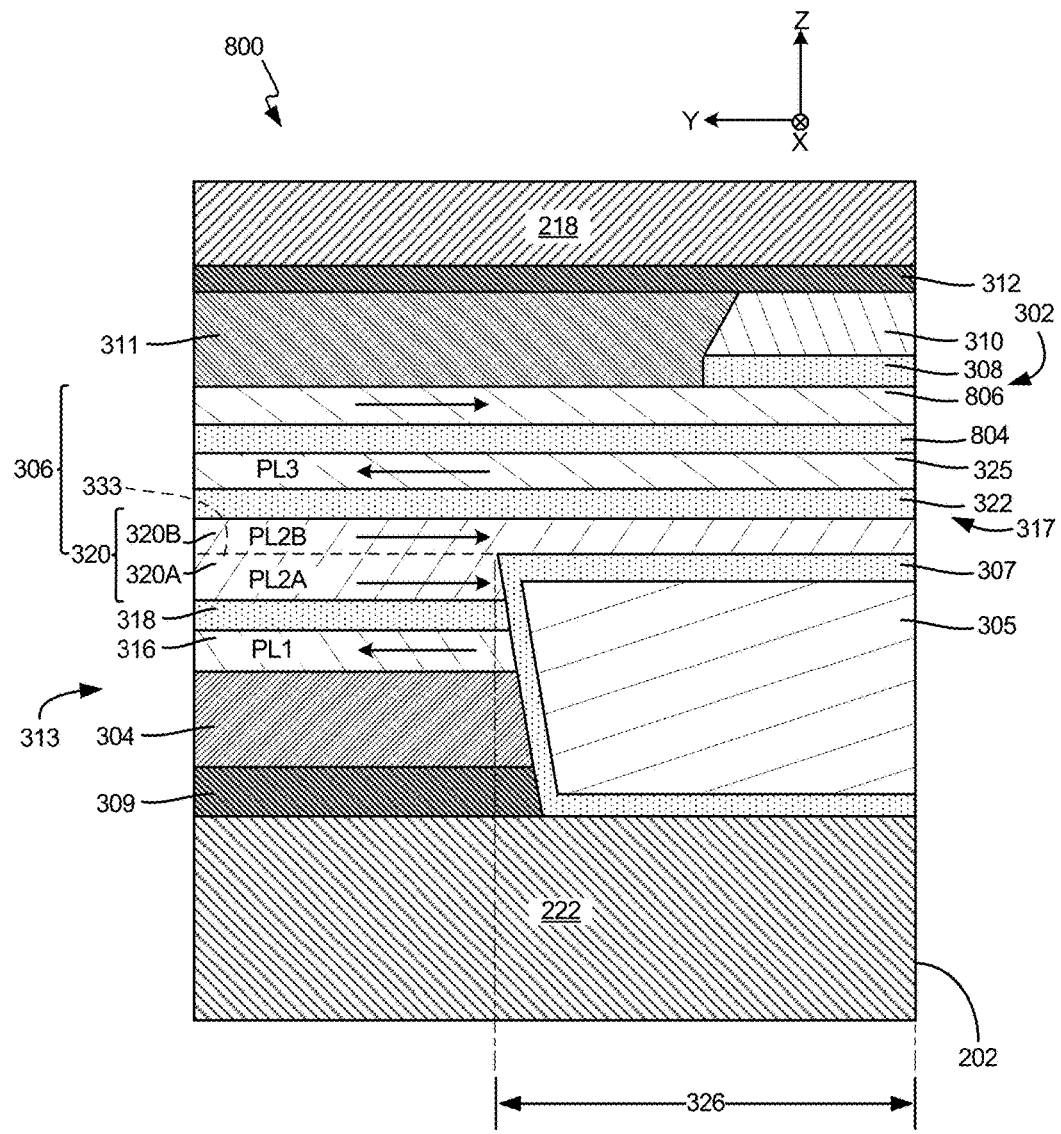
FIG. 8B is a sectional view of the magnetic reproducing device of FIG. 8A.

FIG. 8A is a bearing surface view of a magnetic reproducing device/reader 800 that includes a magnetoresistive sensor 802 that employs a recessed AFM layer in accordance with a fourth embodiment. Recessed elements including recessed AFM layer 304 of reader 800 are visible in FIG. 8B, which is a cross-sectional view of reader 800 of FIG. 8A through a plane orthogonal to the bearing surface and layers of reader 800 (along line D-D' shown in FIG. 8A). Reader 800 differs from reader 300 (of FIGS. 3A and 3B) in that it additionally includes a third separation layer 804 and a third ferromagnetic layer (PL3) 806. As can be seen in FIGS. 8A and 8B, the third separation layer 804 is between PL2B 320B and the third ferromagnetic layer 806. In other respects, reader 800 is substantially similar to reader 300 (of FIGS. 3A and 3B). As in the case of reader 300 (of FIGS. 3A and 3B), reader 800 is fabricated using a sacrificial cap layer formed of a material (Ir, Pt, Pd, Rh, etc.) that alloys magnetically with PL2A 320A to form a suitable stitch interface 333.

Figure 9:
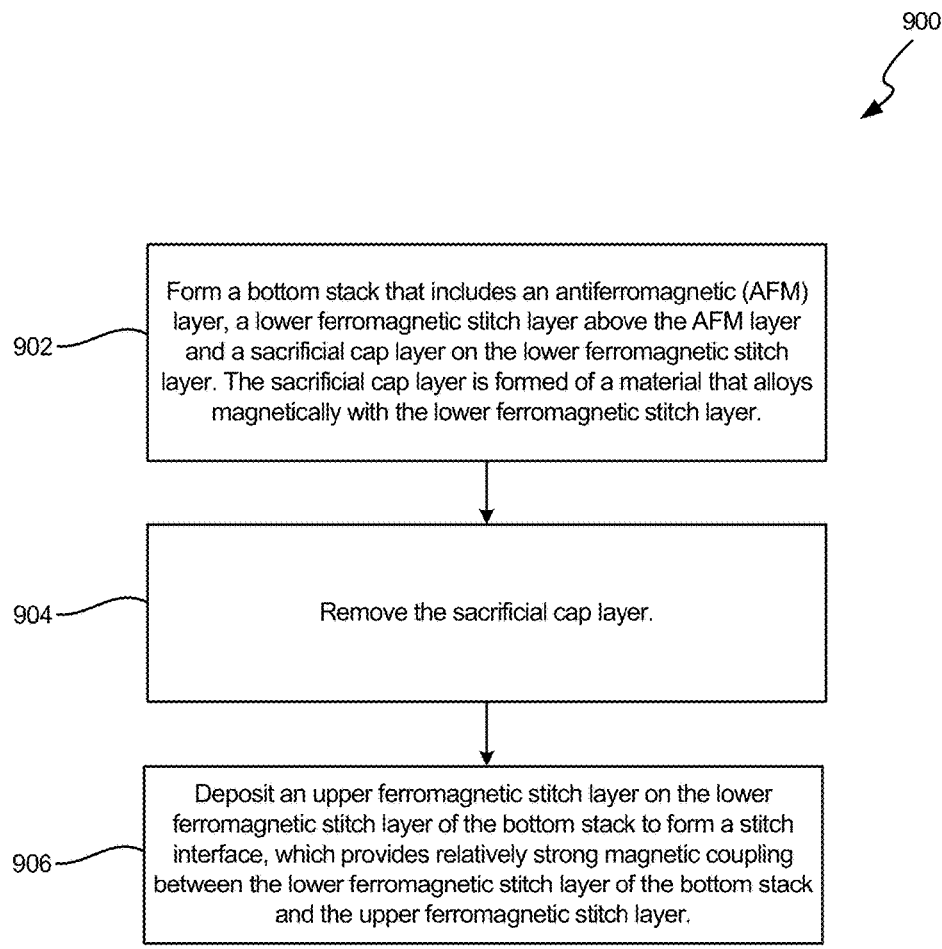
FIG. 9 is a flowchart of a method embodiment.

FIG. 9 is a simplified flow diagram 900 of a method of fabricating a read sensor in accordance with one embodiment. The method includes, at step 902, forming a bottom stack that includes an antiferromagnetic (AFM) layer, a lower ferromagnetic stitch layer above the AFM layer and a sacrificial cap layer on the lower ferromagnetic stitch layer. The sacrificial cap layer is formed of a material that alloys magnetically with the lower ferromagnetic stitch layer. The method further includes substantially removing the sacrificial cap layer at step 904. At step 906, an upper ferromagnetic stitch layer is deposited on the lower ferromagnetic stitch layer of the bottom stack to form a stitch interface, which provides relatively strong magnetic coupling between the lower ferromagnetic stitch layer of the bottom stack and the upper ferromagnetic stitch layer.

Experimental results plotted to compare different devices employing layers such as PL2A and PL2B coupled together by using fabrication processes employing Ru sacrificial cap layers and Ir cap layers, respectively, are briefly described below in connection with FIGS. 10A, 10B, 11A and 11B.

Figure 10A:
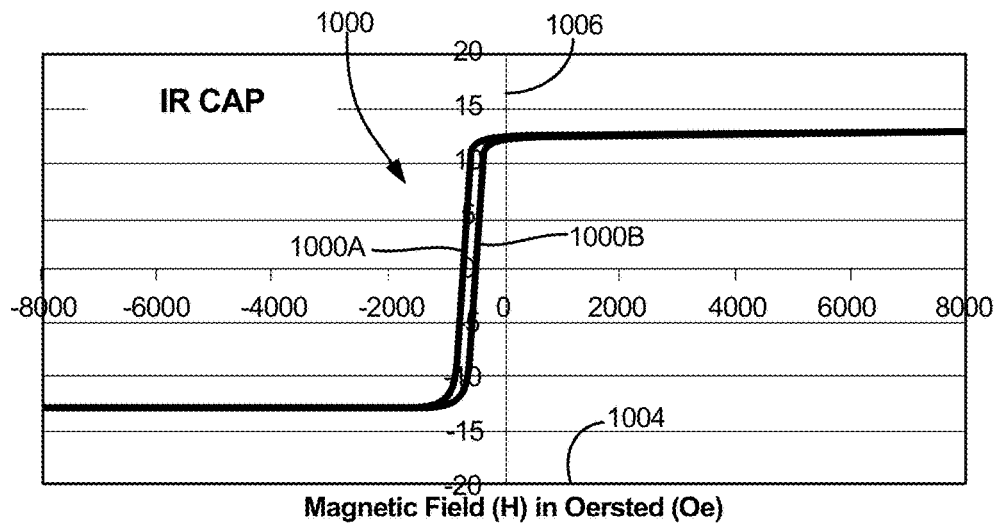
FIGS. 10A, 10B, 11A and 11B are graphs of results obtained from different devices including "stitched" magnetic layers.
Figure 10B:
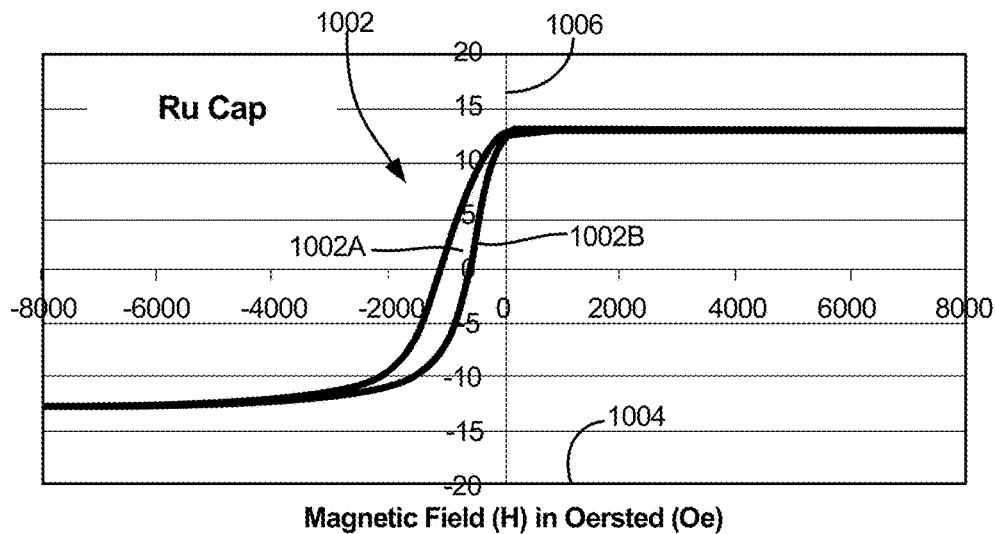

Plots shown in FIGS. 10A and 10B are for sheet film structures in which bottom stacks are "stitched" to top stacks using techniques described above. Each of the structures was fabricated by first forming a bottom stack including a seed layer, an AFM layer, a first ferromagnetic stitch layer (PL2A) and a sacrificial cap layer. The sacrificial cap layer and a portion of the first ferromagnetic layer (PL2A) were then etched. Thereafter, in a subsequent deposition process, a second ferromagnetic stitch layer (PL2B) was deposited on a remaining portion of the etched first ferromagnetic stitch layer (PL2A). A cap layer was formed on PL2B to complete the structure. FIG. 10A illustrates a magnetic loop 1000 obtained for layers PL2A and PL2B of a sheet film structure formed by a fabrication process that employed a sacrificial Ir cap layer. FIG. 10B illustrates a magnetic loop 1002 obtained for layers PL2A and PL2B of a sheet film structure formed by a fabrication process that employed a sacrificial Ru cap layer. Magnetic loops 1000 and 1002 are based on sheet film data obtained from a Magneto-Optical Kerr Effect Magnetometer (MOKEM). In each of the FIGS. 10A and 10B, a horizontal axis 1004 represents an applied magnetic field (H) in Oersted (Oe) and a vertical axis 1006 represents an intensity of a laser beam, which correlates with a magnetization of the respective sensor layers PL2A and PL2B. In FIG. 10A, which shows the magnetic loop 1000 obtained for the structure formed by the fabrication process that employed the sacrificial Ir cap layer, magnetic loop portions 1000A and 1000B substantially overlap, which indicates that switching of magnetization directions of layers PL2A and PL2B are substantially coherent. In FIG. 10B, which shows the magnetic loop 1002 obtained for the structure formed by the fabrication process that employed the sacrificial Ru cap layer, magnetic loop portions 1002A and 1002B do not substantially overlap, which indicates that magnetization directions of PL2A and PL2B may switch independently from each other. This indicates a better coupling of PL2A and PL2B when an Ir sacrificial cap layer is employed, which, in turn, points to a better interface quality.

Figure 11A:
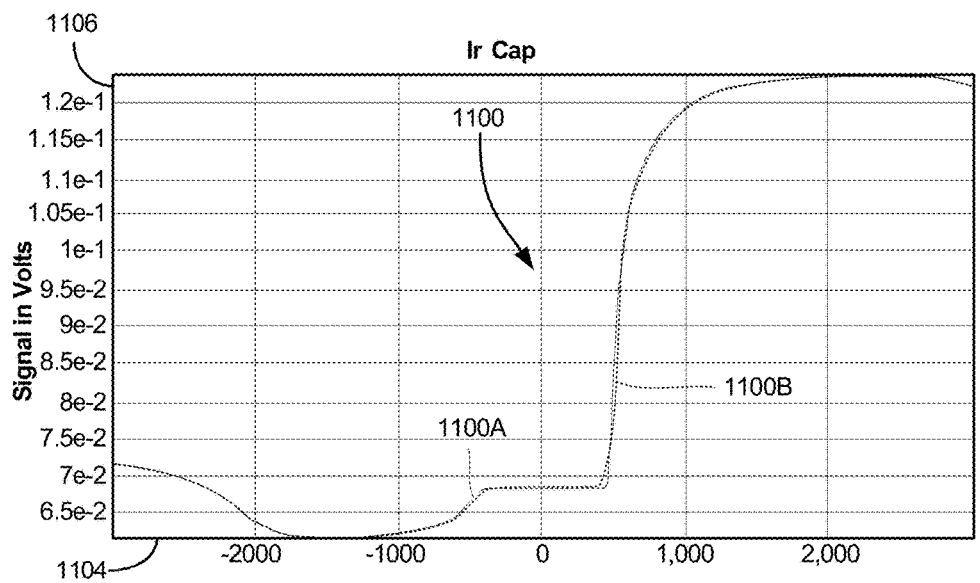
Figure 11B:
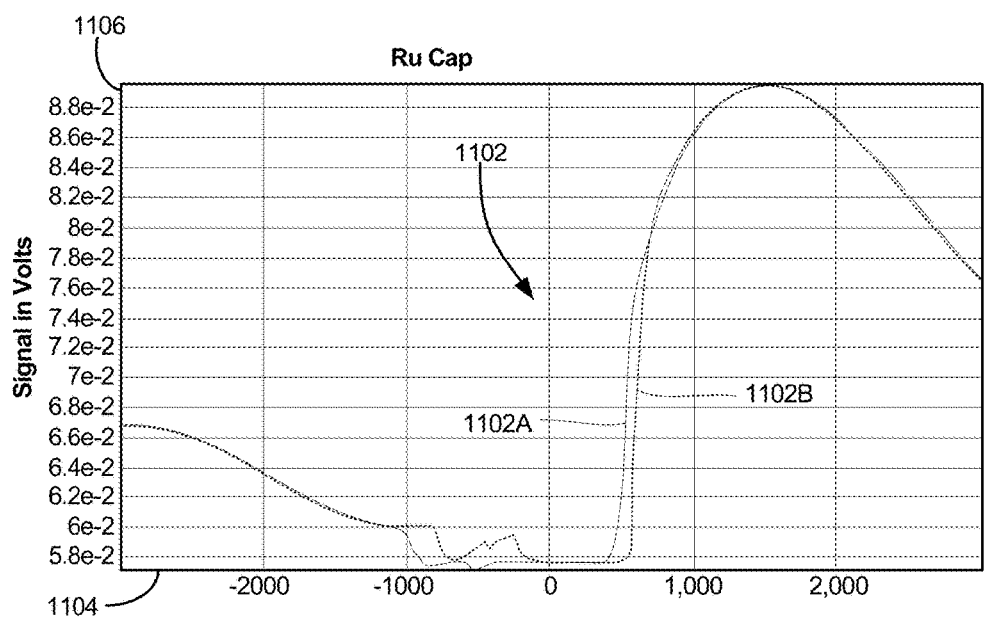

FIGS. 11A and 11B are transfer curves for read sensors of the type shown in FIGS. 3A, 3B and 4 fabricated using Ir and Ru sacrificial cap layers, respectively. FIG. 11A illustrates a transfer curve 1100 obtained for a read sensor formed by a fabrication process that employed a sacrificial Ir cap layer. FIG. 10B illustrates a transfer curve 1102 obtained for a read sensor formed by a fabrication process that employed a sacrificial Ru cap layer. In each of the FIGS. 11A and 11B, a horizontal axis 1104 represents an applied magnetic field (H) in Oe and a vertical axis 1106 represents a signal in volts, which correlates with a percentage of read signal resistance. In FIGS. 11A and 11B, solid lines are used for curves 1100A and 1102A that represent voltage values obtained for different H values incremented in a minus-to-plus direction, and dashed lines are used for curves 1100B and 1102B that represent voltage values for different H values applied in a plus-to-minus direction. In FIG. 11A, which shows the transfer curve 1100 obtained for the read sensor formed by the fabrication process that employed the sacrificial Ir cap layer, curve portions 1100A and 1100B correspond in shape and substantially overlap over the entire range of H values. In FIG. 4B, which shows the transfer curve 1102 obtained for the read sensor formed by the fabrication process that employed the sacrificial Ru cap layer, curve portions 1102A and 1102B do not correspond in shape and do not overlap in certain portions of the range of H values, thereby indicating a higher hysteresis when a sacrificial Ru cap layer is employed. Also, transfer curve 1102 reveals that the voltage signal drops substantially rapidly at high positive fields, which is not the case in transfer curve 1100. Thus, a comparison of transfer curves 1100 and 1102 indicates that the read sensor formed by the fabrication process that employed the sacrificial Ir cap layer is substantially more stable than the read sensor formed by the fabrication process that employed the sacrificial Ru cap layer.

Figure 12A:
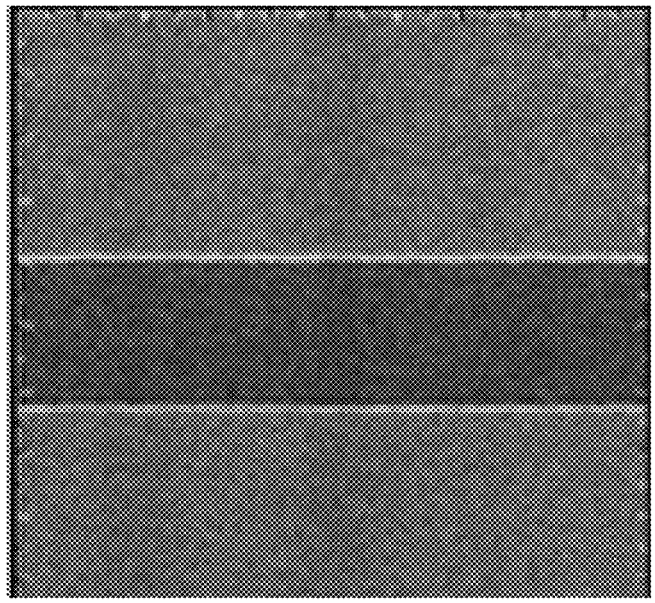
FIGS. 12A and 12B illustrate scanning electron microscope (SEM) images of thin film devices.
Figure 12B:
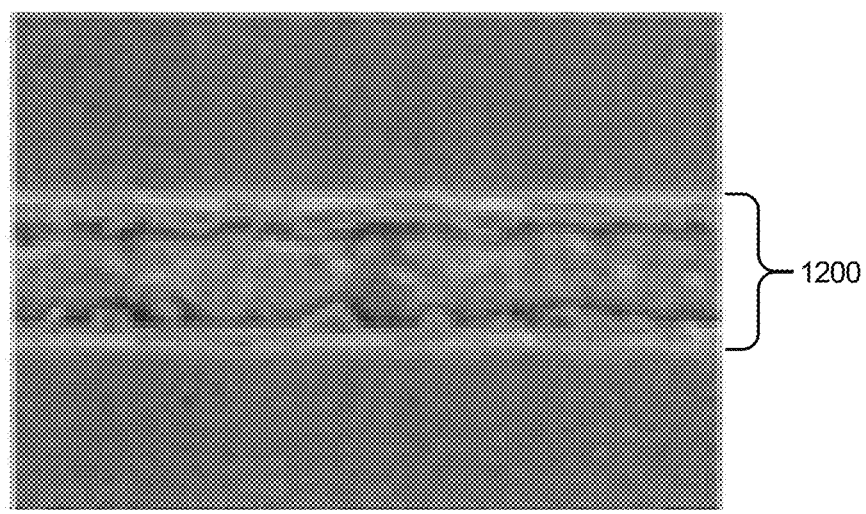

From process point of view, there is another advantage of employing an Ir film over a Ru film as a sacrificial cap layer. Specifically, experiments showed that a thin Ir film of about 2.5 manometers (nm) was capable of protecting a stack from oxidation during an inductively coupled plasma (ICP) etch process, while a Ru film of a similar thickness suffered from corrosion. Scanning electron microscope (SEM) images shown in FIGS. 12A and 12B show no corrosion in layers of FIG. 12A (2.5 nm Ir cap), but corrosion in portion 1200 of FIG. 12B (2.5 nm Ru cap).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of fabricating a read sensor comprising:
    forming a bottom stack that includes an antiferromagnetic (AFM) layer, a lower ferromagnetic stitch layer above the AFM layer and a non-Ru sacrificial cap layer on the lower ferromagnetic stitch layer;
    substantially removing the sacrificial cap layer; and
    depositing an upper ferromagnetic stitch layer on the lower ferromagnetic stitch layer of the bottom stack to form a stitch interface that provides relatively strong magnetic coupling between the lower ferromagnetic stitch layer of the bottom stack and the upper ferromagnetic stitch layer.

2. The method of claim 1 and further comprising, prior to substantially removing the sacrificial cap:
    performing a material removal operation to remove a front portion of the bottom stack, thereby leaving behind a recessed portion of the bottom stack and a front trench;
    depositing a reader front shield in the front trench; and
    depositing a decoupling layer on the reader front shield, wherein the decoupling layer abuts the sacrificial cap layer, and wherein the sacrificial cap layer comprises a first material that is different from a second material from which the decoupling layer is formed.

3. The method of claim 2 and wherein the first material from which the sacrificial cap layer is formed comprises one of Jr, Pt, Pd or Rh and the second material from which the decoupling layer is formed comprises Ru.

4. The method of claim 1 and wherein forming the bottom stack further comprises:
    forming a first pinned layer on the AFM layer; and
    forming a spacer layer between the first pinned layer and the lower ferromagnetic stitch layer,
    wherein the first pinned layer and the lower ferromagnetic stitch layer are antiferromagnetically coupled.

5. The method of claim 1 and wherein the lower ferromagnetic stitch layer is formed directly on the AFM layer.

6. The method of claim 2 and further comprising depositing the upper ferromagnetic stitch layer on the decoupling layer such that the upper ferromagnetic layer covers both the lower ferromagnetic stitch layer and the decoupling layer.

7. The method of claim 6 and further comprising:
depositing a spacer layer on the upper ferromagnetic stitch layer; and
depositing a reference layer on the spacer layer,
wherein the upper ferromagnetic stitch layer and the reference layer are antiferromagnetically coupled.

8. The method of claim 6 and further comprising:
depositing a separation layer on the upper ferromagnetic stitch layer; and
depositing a free layer on the separation layer.

9. The method of claim 6 and further comprising:
depositing a first spacer layer on the upper ferromagnetic stitch layer;
forming a pinned layer on the first spacer layer;
depositing a second spacer layer on the pinned layer;
depositing a reference layer on the second spacer layer.

10. A method of forming a read sensor comprising:
forming a bottom stack over a bottom shield, wherein the bottom stack includes an antiferromagnetic (AFM) layer, a lower ferromagnetic stitch layer above the AFM layer and a sacrificial cap layer on the lower ferromagnetic stitch layer, and wherein the bottom stack includes a front portion and a recessed portion behind the front portion;
performing a material removal operation to remove the front portion of the bottom stack, thereby leaving behind the recessed portion of the bottom stack, a front trench and the bottom shield below the recessed portion of the bottom stack and below the front trench;
depositing a reader front shield in the front trench; and
depositing a decoupling layer on the reader front shield, wherein the decoupling layer abuts the sacrificial cap layer, and wherein the sacrificial cap layer comprises a first material that is different from a second material from which the decoupling layer is formed.

11. The method of claim 10 and wherein the sacrificial cap layer is a non-Ru sacrificial cap layer.

12. The method of claim 10 and wherein the first material comprises one of Ir, Pt, Pd or Rh and the second material comprises Ru.

13. The method of claim 10 and wherein forming the bottom stack further comprises:
forming a first pinned layer on the AFM layer; and
forming a spacer layer between the first pinned layer and the lower ferromagnetic stitch layer,
wherein the first pinned layer and the lower ferromagnetic stitch layer are antiferromagnetically coupled.

14. The method of claim 10 and wherein the lower ferromagnetic stitch layer is formed directly on the AFM layer.

15. The method of claim 10 and further comprising:
substantially removing the sacrificial cap layer;
removing a portion of the decoupling layer; and
depositing an upper ferromagnetic stitch layer on the lower ferromagnetic stitch layer and on a remaining portion of the decoupling layer.

16. The method of claim 15 and further comprising:
depositing a spacer layer on the upper ferromagnetic stitch layer; and
depositing a reference layer on the spacer layer,
wherein the upper ferromagnetic stitch layer and the reference layer are antiferromagnetically coupled.

17. A read sensor structure comprising:
a bottom stack that is recessed from a bearing surface of the read sensor, wherein the bottom stack comprises a recessed antiferromagnetic (AFM) layer, a ferromagnetic stitch layer over the recessed AFM layer, a first pinned layer on the AFM layer, a spacer layer between the first pinned layer and the ferromagnetic stitch layer, wherein the first pinned layer and the ferromagnetic stitch layer are antiferromagnetically coupled;
a reader front shield positioned in front of the bottom stack, wherein a front surface of the reader front shield forms a portion of the bearing surface;
a non-Ru sacrificial cap layer on the ferromagnetic stitch layer; and
a decoupling layer on the reader front shield, wherein the decoupling layer abuts the sacrificial cap layer, and wherein the sacrificial cap layer comprises a first material that is different from a second material from which the decoupling layer is formed.

18. The read sensor structure of claim 17 and wherein the first material comprises one of Ir, Pt, Pd or Rh and the second material comprises Ru.

* * * * *